United States Patent
Albrecht et al.

(10) Patent No.: US 11,594,004 B2
(45) Date of Patent: Feb. 28, 2023

(54) DISTRIBUTED VECTOR-RASTER FUSION

(71) Applicant: International Business Machines Corporation, Armonk, NY (US)

(72) Inventors: Conrad M Albrecht, White Plains, NY (US); Ildar Khabibrakhmanov, Syosset, NY (US); Sharathchandra Pankanti, Darien, CT (US); Levente Klein, Tuchahoe, NY (US); Wang Zhou, White Plains, NY (US); Bruce Gordon Elmegreen, Golden Bridge, NY (US); Siyuan Lu, Yorktown Heights, NY (US); Hendrik F Hamann, Yorktown Heights, NY (US); Carlo Siebenschuh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 16/727,445

(22) Filed: Dec. 26, 2019

(65) Prior Publication Data

US 2021/0200218 A1     Jul. 1, 2021

(51) Int. Cl.
G06V 10/25 (2022.01)
H04W 4/021 (2018.01)
(Continued)

(52) U.S. Cl.
CPC .............. *G06V 10/25* (2022.01); *G01S 17/89* (2013.01); *G06K 9/6288* (2013.01); *G06V 20/13* (2022.01); *H04W 4/021* (2013.01)

(58) Field of Classification Search
CPC ...... G06V 10/25; G06V 20/13; G06V 10/803; G01S 17/89; G06K 9/6288; G06K 9/6289; H04W 4/021
(Continued)

(56) References Cited

U.S. PATENT DOCUMENTS 9,305,107 B2 * 4/2016 Siliski ..................... G06T 11/60
11,204,896 B2 * 12/2021 Albrecht ................. G06F 16/13
(Continued)

FOREIGN PATENT DOCUMENTS

CN      105787457 A     7/2016
CN      108681715 A     10/2018
(Continued)

OTHER PUBLICATIONS

Pajic, Vladimir, et al., "Model of Point Cloud Data Management System in Big Data Paradigm," ISPRS International Journal of Geo-Information 7, No. 7, 2018, 15 pages.
(Continued)

*Primary Examiner* — Muhammad Shafi
(74) *Attorney, Agent, or Firm* — Patterson + Sheridan, LLP

(57) ABSTRACT

In some examples, a method of vector-raster data fusion includes receiving vector data for a geographical location, and statistically analyzing the vector data to obtain vector statistics. In some examples the method further includes rasterizing the vector statistics, and storing at least one of the vector data and the rasterized vector statistics together in a key-value store together with previously stored raster data for the geographical location. In some examples, the vector data further includes metadata, and the method further includes storing the metadata in at least one of the key-value store or a separate vector database.

19 Claims, 8 Drawing Sheets

(51) Int. Cl.
*G06K 9/62* (2022.01)
*G06V 20/13* (2022.01)
*G01S 17/89* (2020.01)

(58) Field of Classification Search
USPC .......................................................... 345/619
See application file for complete search history.

(56) References Cited

U.S. PATENT DOCUMENTS

| | | | |
|---|---|---|---|
| 2006/0041375 | A1* | 2/2006 | Witmer ................ G01C 15/00 701/532 |
| 2016/0084988 | A1* | 3/2016 | Hwang ............... G01V 99/005 702/2 |
| 2017/0011089 | A1* | 1/2017 | Bermudez Rodriguez ................ G06F 16/9537 |
| 2017/0032509 | A1* | 2/2017 | Mannar .................... G06T 7/90 |

FOREIGN PATENT DOCUMENTS

| | | | |
|---|---|---|---|
| CN | 109829021 | * | 5/2019 |
| WO | 2019115873 | A1 | 6/2019 |

OTHER PUBLICATIONS

Xie, Dong, et al., "Simba: Efficient In-Memory Spatial Analytics," Proceedings of the 2016 International Conference on Management of Data, pp. 1071-1085, ACM.
U.S. Appl. No. 15/680,850 entitled "Scalable Space-Time Density Data Fusion", filed Nov. 13, 2018.
U.S. Appl. No. 16/186,237 entitled "Scalable Feature Classification for Laser Scanning Data and Digital Elevation Models", filed Nov. 9, 2018.
U.S. Appl. No. 16/658,533 entitled "Predicting and Correcting Vegetation State", filed Oct. 21, 2019.
U.S. Appl. No. 16/188,964 entitled "Efficient Querying Using Overview Layers of Geospatial-Temporal Data in a Data Analytics Platform", filed Nov. 13, 2018.
U.S. Appl. No. 15/816,357 entitled "Scalable Space-Time Density Data Fusion", filed Nov. 17, 2017.
International Application No. PCT/IB2018/056117 entitled "Scalable Space-Time Density Data Fusion", filed Aug. 15, 2018.
International Search Report and Written Opinion for International Application No. PCT/IB2018/056117 dated May 14, 2019.
PCT International Search Report for Application No. PCT/IB2020/058917 dated Dec. 30, 2020.

* cited by examiner

| Spatial Index 211 | Spatial Statistics 213 | | | Vector Data Value Statistics 217 | |
|---|---|---|---|---|---|
| | Density 214 | Center of Mass | Inertia Tensor 215 | Mean 218 | Standard Deviation 219 |
| 1119 | 0.01 | | [ [0,0,0],[0,0,0],[0,0,0]] ... | -.21 | 0 ... |
| 1200 | 0.03 | | [ [.43,0,-.1],[0,2.,0],[-.1,0,4.2]] ... | 1.124 | 0.34 ... |
| 1224 | 0.09 | | [ [.2,1,-.2],[1,.21,0],[-.2,0,2.]] ... | 12.018 | 1.651 ... |
| 1227 | 0.01 | | [ [0,0,0],[0,0,0],[0,0,0]] ... | 9.3 | 0 ... |
| 2001 | 0.01 | | [ [0,0,0],[0,0,0],[0,0,0]] ... | 2.43 | 0 ... |

| Geometry Index 413 | Geometry 415 | Metadata 417 |
|---|---|---|
| 111912 | POINT((38.3,24.3)) | {"survey-id": 7, ...} |
| 1200 | POLYGON((16.8,14.5) ...) | {"survey-id": 1, ...} |
| 1224 | POLYGON((38.3,24.3) ...) | {"survey-id": 3, ...} |
| 200143 | POINT((32.3,37.4)) | {"survey-id": 43, ...} |
| 1 | POLYGON((10,30) (10,10) ,..) | {"satellite-id": 2, ...} |

DISTRIBUTED VECTOR-RASTER FUSION

BACKGROUND

The present invention relates to geospatial data, and more specifically, to processing and rasterization of vector data for a geographic location and storing geo-spatially indexed vector data and their rasterized version in a key-value store together with previously stored raster data for the same geographic location.

Currently, geospatial software solutions do not support scalable or distributed analytics for fusing petabytes of vector data with raster data. In this context it is noted that there are ever increasing amounts of vector data available. Such vector data may be generated by, for example, airborne mounted LASER devices used, for example, for vegetation management, Light Detection and Ranging (LiDAR) hardware installed on automobiles intended for autonomous driving, automatic geo-tagging of human infrastructure such as points-of-interest, roads, or houses, visual recognition algorithms employing cameras, or satellite imagery.

Thus, there is an increasing need to curate, host and geo-temporally index such information for analytics processing such as, for example, cross-layer filtering and fusion with existing raster and vector data (e.g. elevation, satellite imagery, weather data, census, etc.), or, for example, machine learning for vegetation management, terrain modeling, archeology discovery under vegetation, and similar applications.

It is useful to provide solutions to address the ever growing need for vector-raster data fusion, in particular in geospatial information systems (GISs).

SUMMARY

According to one embodiment of the present invention, a method is provided. The method includes receiving vector data for a geographical location, statistically analyzing the vector data to obtain vector statistics, rasterizing the vector statistics and storing at least one of the vector data and the vector statistics in a key-value store together with previously stored raster data for the geographical location.

According to a second embodiment of the present disclosure, a system is provided. The system includes a data ingestion engine. The data ingestion engine includes a data uploader configured to receive vector data, and a vector data rasterizer, coupled to the data uploader and to a key-value store, and configured to rasterize the vector data and store it, together with previously stored raster data for the geographical location.

According to a third embodiment of the present disclosure, a computer-readable storage medium is provided. The computer-readable storage medium has computer-readable program code embodied therewith, the computer-readable program code executable by one or more computer processors to perform an operation. The operation includes to receive vector data for a geographical location, statistically analyze the vector data to obtain vector statistics, and rasterize the vector statistics. The operation further includes to store at least one of the vector data and the vector statistics in a key-value store together with previously stored raster data for the geographical location.

DETAILED DESCRIPTION

Figure 1:
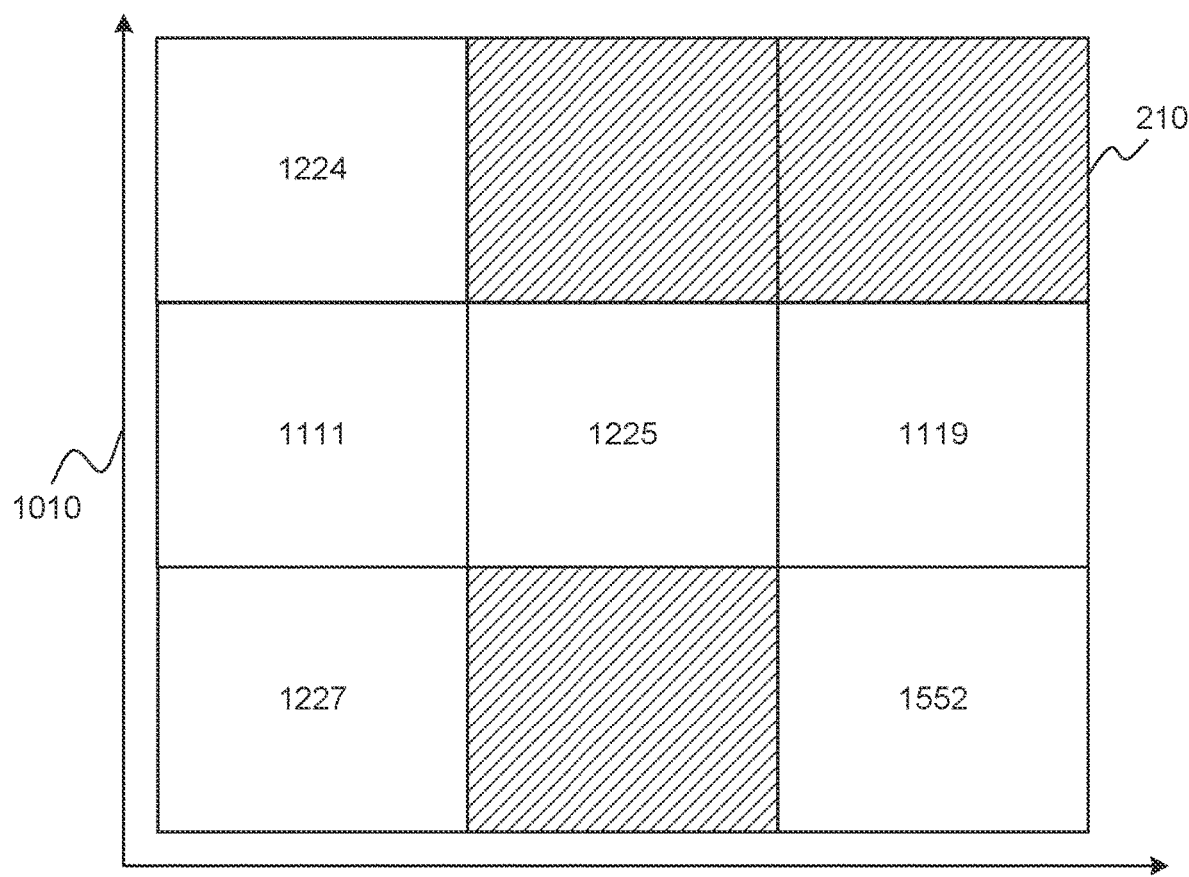
FIG. 1 illustrates raster data for several geographic locations, according to one embodiment disclosed herein.

Embodiments and examples described herein relate to geospatial information, and in particular to systems and methods for fusion of vector data for a geographic location with raster data for the same geographic location.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

In accordance with one or more embodiments, vector data for a geographic location is received, processed, and then fused with raster data for the same geographic location. The fused vector-raster data is then stored in a single key-value store. In one or more embodiments, a user may then query the key-value store and obtain all relevant data for the geographic location available in a given system.

By way of background, vector data and raster data, as used in geospatial information systems (GISs), are next described. It is noted that spatial data observations focus on locations. Thus, every house, every tree and every city has its own unique set of latitude and longitude coordinates. The two primary types of spatial data are vector and raster data in GIS. These are next described.

Raster data is made up of pixels, also referred to as grid cells. They are usually regularly-spaced and square but do not have to be. Rasters often look pixelated because each pixel has its own value or class. For example, each pixel value in a satellite image has a red, green and blue value. Of course, values from a near-infrared or other electromagnetic band may also be available. Alternatively, each value in an elevation map represents a specific height. The value may represent anything from, for example, rainfall to land cover. Raster models are useful for storing data that varies continuously, such as, for example, elevation surfaces, temperature and lead contamination. However, categorical data, for example for land classification or crop masks, are discrete cases that may be represented as rasters as well.

Raster data models consist of two categories, discrete and continuous. Discrete rasters have distinct values, and distinct themes or categories. For example, one grid cell may represent a land cover class or a soil type. In a discrete raster land cover or land use map, one may distinguish each thematic class. Each class may be discretely defined where it begins and ends. In other words, each land cover cell may be definable and may fill the entire area of the cell. Additionally, discrete data usually consists of integers to represent classes. For example, a value of "1" might represent urban areas, a value of "2" may represent forest, etc.

In contrast to discrete rasters, continuous rasters have gradual change. Thus, continuous rasters include grid cells with gradually changing data such as elevation, temperature or an aerial photograph. Thus, a continuous raster surface may be derived from a fixed registration point. For example, digital elevation models use sea level as a registration point, and each cell represents a value above or below sea level. As another example, aspect cell values have fixed directions such as north, east, south or west.

In some examples, phenomena can vary gradually along a continuous raster from a specific source. For example, in depicting an oil spill, a raster may show how the fluid moves from a high concentration to a low concentration. At the source of the oil spill the concentration is higher and diffuses outwards with diminishing values as a function of distance.

Moreover, certain map algebra with raster data is generally quickly and easily performed, such as, for example, counting raster cells with values above a certain threshold. Overall, quantitative analysis is intuitive with discrete or continuous rasters. On the other hand, because cell size contributes to graphic quality, raster data can have a pixelated look and feel. In particular the fixed grid and raster cell size constrains the accuracy of the data represented. To illustrate, linear features, for example, roads, and paths are difficult to display. Moreover, one cannot create network datasets or perform topology rules on rasters. Additionally, raster datasets may become potentially very large because they record values for each cell in an image. As resolution increases, the size of the cell decreases, and this comes at a cost for speed of processing and data storage.

The other type of data commonly used in a GIS is vector data. Vector data is not made up of a grid of pixels. Instead, vector graphics are comprised of vertices and paths. The three basic symbol types for vector data are points, lines and polygons (areas). Because cartographers use these symbols to represent real-world features in maps, they often have to decide which to use based on the level of detail in the map. These three types are next described.

Vector points are simply coordinates in a multi-dimensional co-ordinate reference system. Specifically, in the remote sensing context one typically deals with two- or three-dimensional space, e.g. longitude, latitude, and altitude. When features are too small to be represented as polygons, points are used. For example, city boundary lines cannot be seen at a global scale. In this case, maps often use points to display cities. Vector lines connect each vertex with paths. Basically, dots are connected in a set order and the connecting line becomes a vector line with each dot representing a vertex.

Lines usually represent features that are linear in nature. For example, maps show rivers, roads and pipelines as vector lines. Often, busier highways have thicker lines than an abandoned road.

On the other hand, networks are line data sets but they are often considered to be different. This is because linear networks are topologically connected elements. They consist of junctions and turns with connectivity. If one were to find an optimal route using a traffic line network, it would follow set rules. For example, it may restrict turns and movement on one-way streets. When a set of vertices is joined in a particular order and closed, the result is a vector polygon feature. In order to create a polygon, the first and last coordinate pair need to be the same.

Cartographers often use polygons to show boundaries, and each polygon has an area. For example, a building footprint has a square footage and agricultural fields have acreage.

Because vector data have vertices and paths, the graphical output is generally more aesthetically-pleasing. Furthermore, it gives higher geographic accuracy because data is not dependent on grid size (resolution for a raster grid). Topology rules can help data integrity with vector data models. Moreover, network analysis and proximity operations use vector data structures. However, continuous data is poorly stored and displayed as vectors. In order to display continuous data as a vector, substantial generalization is required.

Thus, it is often useful to use raster data for some geospatial content, and vector data for other geospatial content. However, this precludes a user from consuming or analyzing all of the relevant data in an integrated form.

To illustrate one possible example use of vector-raster data fusion, it is noted that the International Business Machines (IBM) product IBM PAIRS Geoscope™ hosts raster data on elevation from the National Elevation Dataset (NED) and specific absorption rates (SAR) measurements from the Sentinel-1 mission for the geospatial area of the continental United States. In order to generate a digital elevation model with improved accuracy, it would be very useful to add high-resolution (e.g., 20 points per m$^2$) LiDAR point cloud LiDAR data for the continental United States, and fuse this data with the NED and Sentinel-1 datasets. LiDAR is an active remote sensing system that records reflected or returned light energy. A discrete return LiDAR system records the strongest reflections of light as discrete or individual points, where each point has an associated X, Y and Z value associated with it. It also has an intensity which represents the amount of reflected light energy that returned to the sensor. For example, the LiDAR vector data relevant to the continental US may be, for example, on the order of ~200 TBs of LiDAR data, on the lower end. However, it may be somewhat larger. For example, the contiguous United States (referred to herein as "ConUS") has a land size of roughly 3000×5000 km$^2$, which equals 15,000,000, or 15×10$^6$, km$^2$. Converting to square meters, the ConUS has a size of 15×10$^{12}$ m$^2$. Moreover, there is, for example, on the order of 10 LiDAR point measurements per square meter, thus yielding, for the ConUS at large, 15×10$^{13}$ points. If each point only required a single byte to store it, the LiDAR vector data, in this example, equals 150 TB. In actuality, LiDAR point cloud data have associated attributes that generate another factor of 10, so the total data set is on the order of 1500×10$^{12}$ bytes, or 1500 Terabytes, which is 1.5 Petabytes). Once in place, the fused raster-vector data may be employed for accurate vegetation management and flood risk modeling, as one example.

Figure 2:
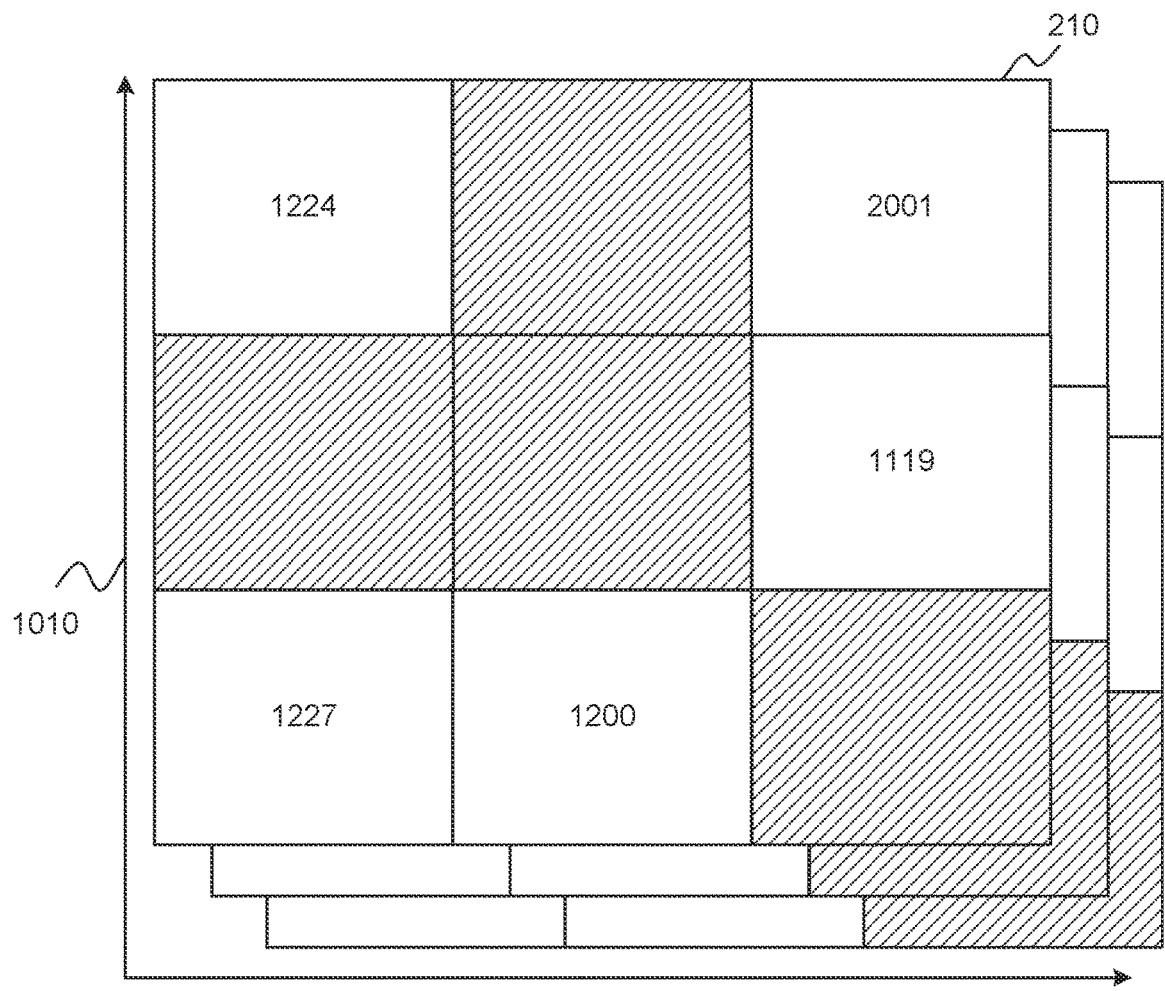
FIG. 2 illustrates rasterized vector statistics for vector data relating to some of the several geographic locations shown in FIG. 1, according to one embodiment disclosed herein.
Figure 3:
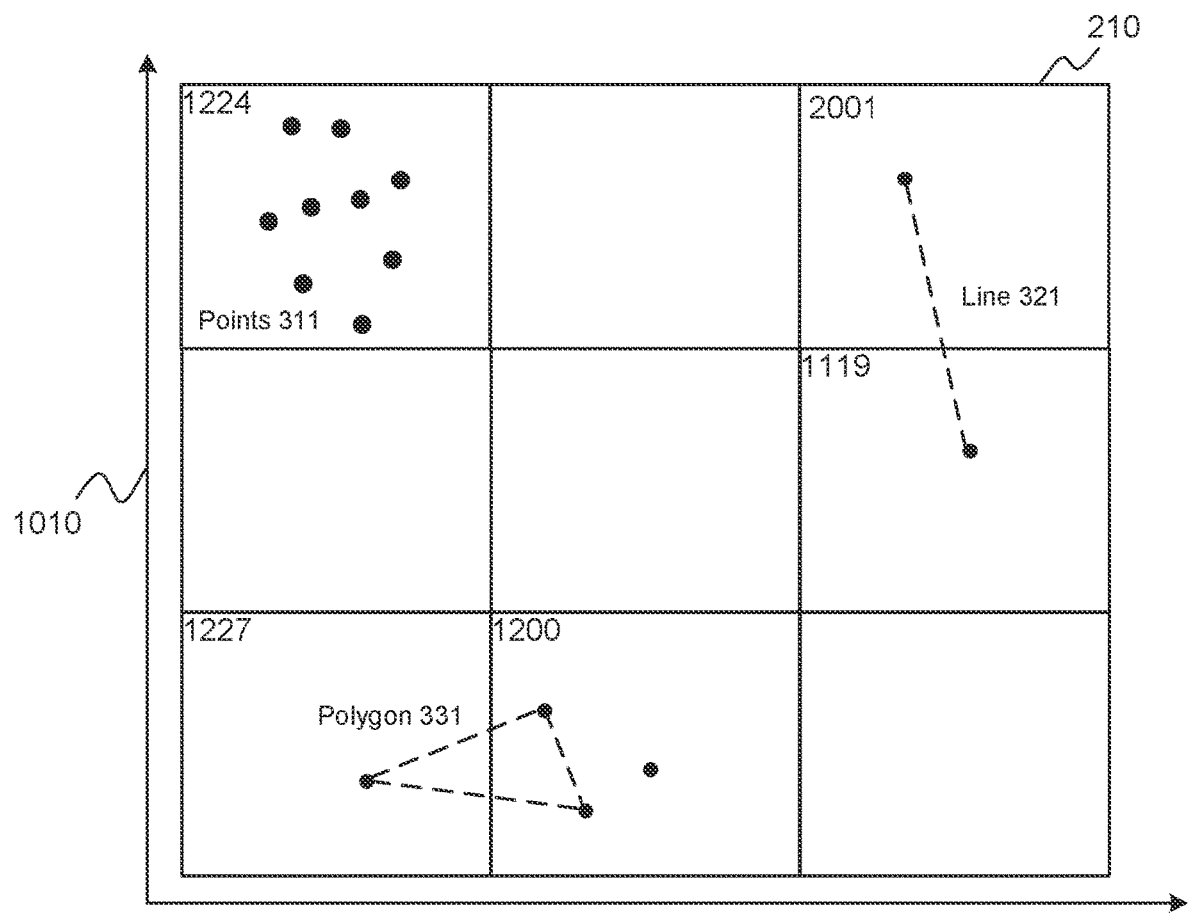
FIG. 3 illustrates vector data from which the vector statistics of FIG. 2 were generated for the geographic locations shown in FIG. 2, according to one embodiment disclosed herein.
Figure 4:
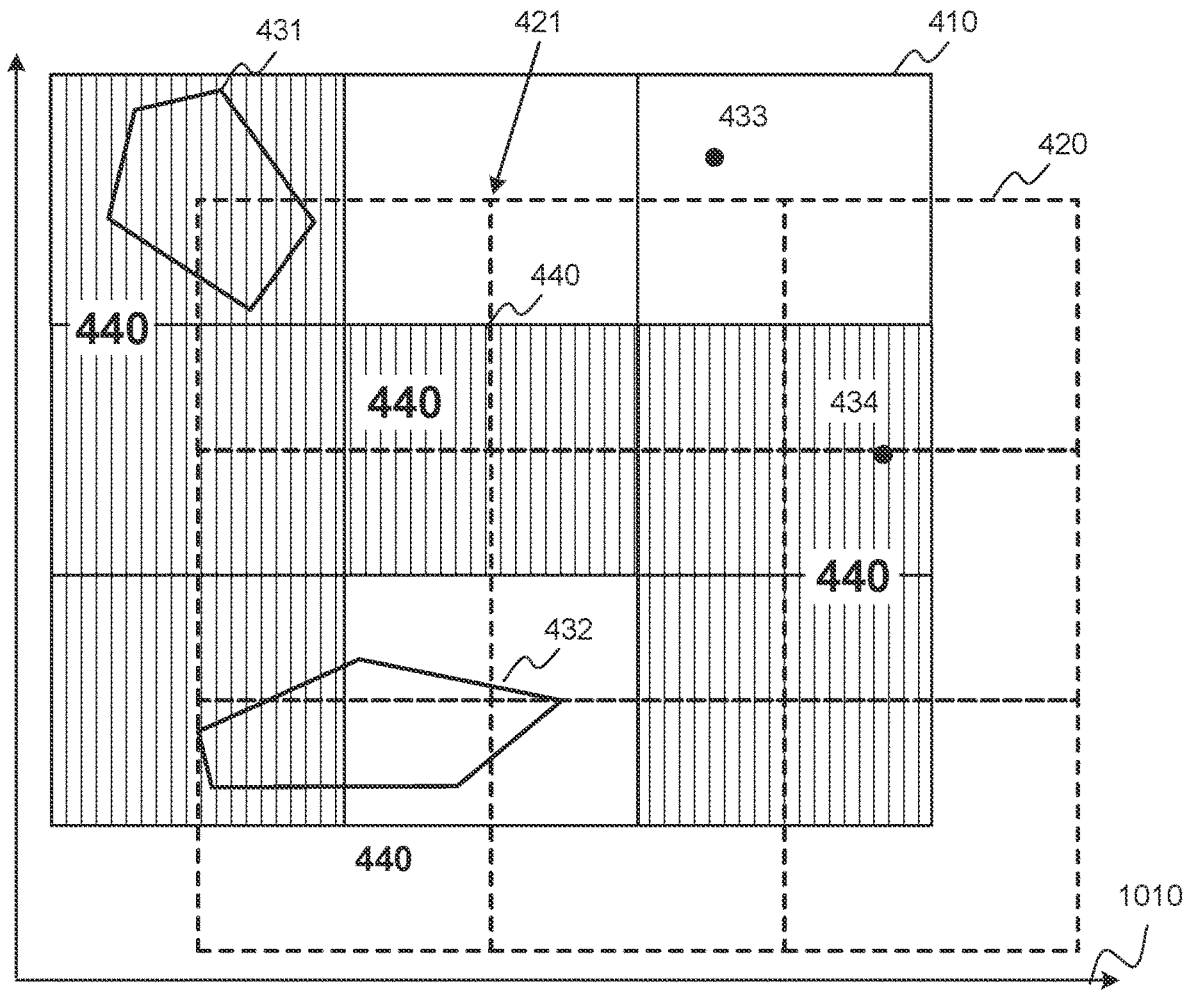
FIG. 4 illustrates the spatial grid of FIGS. 1-3 to index raster and vector data, now populated with metadata for the vector data of FIG. 3, and where the raster data of FIG. 1 is marked for reference, according to one embodiment disclosed herein.

FIG. 1 illustrates raster data for several geographic cells, according to one embodiment disclosed herein. As used herein, a geographic cell may be referred to as a "geographic region." With reference to FIG. 1, there is shown raster grid 1000, containing nine example cells. Six of the cells have data, and, as shown in FIG. 1, a shaded cell indicates no data. The values for each of the six cells that do have data are respectively provided in the chart below the raster grid. There is also shown co-ordinate system 1010. The spatial indices of each of the nine cells of raster grid 1000 are relative to co-ordinate system 1010. FIGS. 2, 3 and 4, described below, also use co-ordinate system 1010. This is because in order to fuse vector data with raster data, a unified co-ordinate reference system must be used for both data types, including metadata associated with the vector data, as described below in greater detail with reference to FIG. 4.

Continuing with reference to FIG. 1, provided below raster grid 1000 is a table with two columns. The first (leftmost) column 1013 has the spatial index of the cell, and the second column has the data value for the cell. The spatial index 1013 may be, for example, a Z-order value. It is noted that the Z-order is a scheme to linearly sort a multi-dimensional index such that the term "spatial closeness", with respect to a given metric, typically the Euclidean metric, stays approximately intact. It is noted, though, that it is impossible to exactly preserve a metric structure when reducing the dimensionality of a space. Thus, for example, while on a grid in two dimensions there are 4 neighbors, in a linear chain each element may have only 2 neighbors.

As shown in the Spatial Index column 1013 of the data table of FIG. 1, three of the spatial indices of cells of the raster grid are underlined, namely cells 1119, 1224, and 1227. This is because there is also vector data available for these same cells, described below in connection with FIGS. 2 and 3, and thus that vector data may be processed and fused with the raster data for these cells as shown in FIG. 1, column 1015, in accordance with various embodiments disclosed herein. In accordance with one or more embodiments disclosed herein, the raster data of FIG. 1 may be previously stored in a key-value store. In accordance with one or more embodiments, the processed vector data may be stored in the key-value store together with previously stored raster data for the geographical location.

FIG. 2 illustrates rasterized vector statistics for vector data relating to some of the several geographic locations shown in FIG. 1, according to one embodiment disclosed herein. As shown in FIG. 2, there is a set of raster grids stacked upon each other, and the top raster grid 210 is identical to the raster grid 1010 shown in FIG. 1. However, in raster grid 210 there is data for different cells than those that have raster data in FIG. 1. Thus, in raster grid 210 there is no data for cells 1111, 1225 or 1552, and thus these are shown as shaded (no data) in FIG. 2. But, in raster grid 210 there is now data for cells 1200 and 2001 compared to the raster grid 210 from FIG. 1. The data that is shown in the five cells of FIG. 2 for which there is data, is obtained by processing vector data after plotting it in the same universal co-ordinate system 1010, and, to the extent the vector data spans or crosses multiple raster grid cells, by dividing it up into the vector data specific to each cell. In order to fully appreciate what is shown in FIG. 2, it is noted that the vector statistics shown in the table of FIG. 2 are obtained by processing the vector data shown in FIG. 3, described in detail below.

Continuing with reference to FIG. 2, the table shown is organized by spatial index 211, which uses the same identifiers as the table shown in FIG. 1. As noted, in the table of FIG. 2, five cells are shown to have rasterized vector statistics, and of these five, three of them match cells in FIG. 1 for which there are raster data. Thus, in accordance with various embodiments, the raster data of cells 1119, 1224 and 1227, may be respectively joined with the rasterized vector statistics for these cells was shown in FIG. 2. The rasterized vector statistics include, for example, as shown in FIG. 2, spatial statistics 213 and vector data value statistics 217. Spatial statistics 213 includes, for example, density 214, and center of mass (COM) inertia tensor 215. Density 214 refers to the number of points per cell, in this example for a cell that has a size of 10 by 10 in units of the co-ordinate system. Thus for cells such as 2001, 1119, and 1227, which, as shown in FIG. 3, each have only one point vector data, the density, as shown in FIG. 2, is 0.01, for example. Similarly, cell 1200, which has three points of vector data in FIG. 3, has a density of 0.03, and cell 1224, in which there are nine points, has a density of 0.09.

Continuing further with reference to FIG. 2, vector data value statistics 217 includes, for example, but is noted as not limited to, vector mean 218, and standard deviation 219. The vector mean is the mean of the values of the vector data for each point in a cell. As shown, for example, for the cells 1119, 1227 and 2001, which have only one point each (see FIG. 3), and thus only one component of the mean, the standard deviation is 0, as expected.

FIG. 3 illustrates vector data from which the vector statistics of FIG. 2 were generated for the respective geographic locations shown in FIG. 2, according to one embodiment disclosed herein. With reference thereto, in FIG. 3 there is shown raster grid 210, with the actual vector data for each of the same cells as shown in FIG. 2, namely cells 1119, 1200, 1224, 1227, and 2001, in ascending Z-order. It is noted that for each of the listed cells the co-ordinates of the associated vector data is provided for each point in the cell. Thus, cell 1200 has three entries, and cell 1224 has nine entries.

Thus, cell 1224 has nine individual points, e.g. from LiDAR scans, cells 2001 and 1119 each have one point, but these are connected by a line to form a linear vector data, and cell 1227 has a single point, but it forms part of a polygonal area with the left most two of the three points of cell 1200.

Additionally, provided below raster grid 210 is a table with a row entry for each of the points shown in FIG. 3, the entries provided cell by cell. For each entry there are five fields, shown as columns in the table. The first column is a spatial index 301. This is the same as the spatial indexes seen before in FIGS. 1 and 2, except that here in FIG. 3 there is an additional two digit term following the cell number (spatial index), to uniquely identify each point within each of the cells. Specifically, these extra digits result from a higher resolution Z-order such that all points can be separated. There is also an ID 303 grouping points to uniquely identify lines and (multi-)polygons. Thus, the two points in cell 1200 and the single point in cell 1227, each have an ISD of "4", which refers to polygon 331 shown in the raster grid above. Continuing with the vector data in the table of FIG. 3, to the right of ID 303 there is spatial co-ordinates 315, a previous/next point neighbor index 317 and finally a vector data value 319 for the point, which can represent any of the measurements or variable values described above, such as, for example, point cloud LiDAR data.

Thus, for example, beginning with cell 1119, there is a single point, identified as spatial index "1119 12." Noteworthy here is the previous/next index 317, which shows a previous point neighbor "null", which means no previous neighbor point, but a next point neighbor of "2001 43", which refers to the single point in cell 2001, which, as shown in FIG. 3, is connected to point 1119 12 by a line. Similarly, in the row entry for cell 2001, there is a single point, "2001 43" which shows a previous point neighbor of "1119 12", but a next point neighbor of "null." Thus, the vector data indicates that cells 1119 and 2001 each have a single point, and these two points are connected in a line.

Similarly, the previous/next neighbor field of the vector data also indicates the connection between the single point of cell 1227, "1227 44" and the leftmost two points of cell 1200, namely "1200 22" and "1200 27." Thus the previous/next pair for "1200 22" is 122744/120027, and the previous/next pair for point "1200 27" is 120022/122744. Finally, the previous/next pair for "1227 44" is 120027/120022", thus completing the triangle polygon. Finally, in FIG. 3, the nine points comprising cell 1224 are separately listed in the table, but they are not connected, as seen in the previous/next pair for each of them, which is "null/null." They simply happen to occupy the same cell or geographic region.

As noted above, the vector data of FIG. 3 is used as the inputs to the various statistical analysis operations whose results are provided in the table of FIG. 2. Thus, by referencing the vector data of FIG. 3 in terms of the unified co-ordinate system 1010 used in FIGS. 1 and 2, each of the vector data and vector statistics may be joined, in the key-value store, with the previously stored raster data.

FIG. 4 illustrates metadata for the vector data of FIG. 3, according to one embodiment disclosed herein. With reference thereto, there is shown raster grid 410 which is equivalent to grid 210 of FIGS. 1 to 3, upon which is superimposed a spatially shifted grid 420, shown in a dashed line. Spatially shifted grid 420 is shifted by half a grid cell of raster grid 410 in all spatial dimensions in order to allow extended Z-ordering (XZ-order) for vector data. Thus, as shown in FIG. 4, the corners of each cell of spatially shifted grid 420 lay in the center of each cell of raster grid 410. This is shown, for example, at corner 421 of shifted grid 420, but is true for each corner of spatially shifted grid 420 and each center point of each cell of raster grid 410. In one or more embodiments disclosed herein, metadata information, such as, for example, data collection vendor, sensor parameters, etc., may be extracted from the vector data and linked to a timestamp and geo-spatial area represented by an appropriate geospatial data structure such as, for example, a minimum spanning tree, a (multi)polygon, or the like. The resulting data structure may be ingested into an existing vector database, or, for example, become part of a scalable, fault-tolerant vector database component. Moreover, designing the Geometry Index 413 in accordance with the Spatial Index 1013 of FIG. 1, the Spatial Index 211 of FIG. 2, and the Spatial Index 301 of FIG. 3 allows for the linkage and integration of a vector database (e.g., 163 of FIG. 5) with a key-value store (e.g., 161 of FIG. 5) where the raster data is saved. It is here noted that because metadata is typically small in volume, direct integration of metadata with the key-value store is not mandatory, in one or more embodiments, for an example system to function.

Continuing with reference to FIG. 4, the raster grid 410 includes a large shaded polygonal area 440 that covers the six cells 1224, 1111, 1225, 1119, 1227 and 1552 which reflects the raster pixels populated and indexed by the Z-order, as shown in FIG. 1. Moreover, polygons 431 and 432, and points 433 and 434 are each also plotted. The two polygons and the two points respectively cover all of the vector data points listed in FIG. 3, and thus the spatial index column 301 of FIG. 3 corresponds to the "geometry index" 413 of FIG. 4, which, for this specific example, lists either a four digit, or a six digit, spatial index value, as appropriate. For example, for cell 1224, because all of the nine points are associated with polygon 431, only "1224" needs be listed as the spatial index 413 for that polygon. In general, a Z-order index may be chosen whose associated cell best covers the associated vector data. Since there are situations where a polygon would be represented by the global Z-order index 1 although the polygon's area approaches zero, XZ-Order is applied to ameliorate this defect. Similarly, the spatial co-ordinates column 315 of FIG. 3 corresponds to the "geometry" column 415 of FIG. 4, which lists the spatial co-ordinates of the points comprising each row entry of the table of FIG. 4. However, as is characteristic to metadata, the number of co-ordinates is reduced in column 415 when compared with 315. To this end, for example, one may compare the 9 points 311 of FIG. 3 with the associated convex hull polygon 431 of FIG. 4 which consists of only 5 points.

It is noted that in the "geometry index" column 413 of FIG. 4, as shown, by way of example, an index with more digits corresponds to a higher resolution vector data object, such as a point or set of points. Thus, the polygons 431 and 432 in FIG. 4 are essentially mid-sized, and thus have a four digit geometry index, the large h-shape polygon 440 is large in size, and thus has a single digit index, and the points 433 and 434, being the highest resolution vector data objects shown, each have a six digit geometry index.

Continuing further with reference to FIG. 4, the "metadata" column 417 of FIG. 4 describes the origin or source of the vector data for each row. Thus, FIG. 4 has metadata entries for each of the three polygons 431, 432 and 440, and the two individual points 433 and 434. In one or more embodiments disclosed herein, by listing the metadata by geospatial data structure, efficiencies are realized, as the metadata need only be stored once, along with the geospatial data structure that covers the set of points having that metadata.

Figure 5:
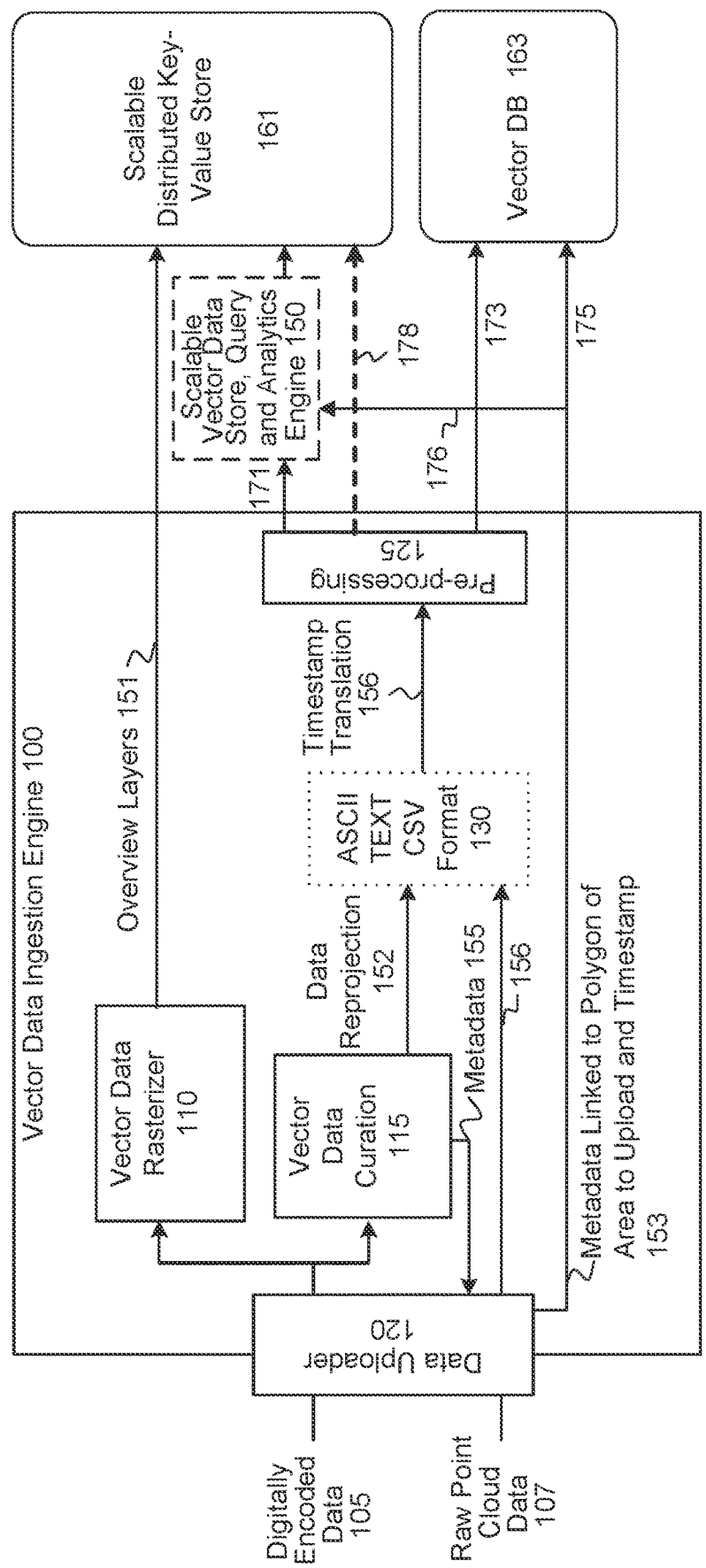
FIG. 5 illustrates a schematic drawing of an example system, according to one embodiment disclosed herein.

FIG. 5 illustrates a schematic drawing of an example system, according to one embodiment disclosed herein. The system of FIG. 5 may be used to interoperate with, or enhance, a web based geospatial software solution, such as, for example, IBM Corporation's PAIRS Geoscope™, where the geospatial software solution is already configured to upload, receive, process and, in response to user queries, display both raster data and vector data, albeit separately, based on separate raster and vector queries.

With reference to FIG. 5, there is a vector data ingestion engine 100, configured to receive, process, and stream into a storage system vector data relating to a geographic location, in accordance with one or more embodiments disclosed herein. Vector data ingestion engine 100 includes data uploader 120, which receives both, specifically, raw point cloud vector data 107, as well as, in general, digitally encoded vector data 105, such as, for example, LAS files. It is noted that LAS files are an industry-standard binary format for storing airborne LiDAR data.

From data uploader 120, the vector data 105 is processed in parallel, by two different processes. A first process inputs the vector data to vector data rasterizer 110, where it is rasterized as described above with reference to FIGS. 3 and 2, by first calculating vector data statistics (shown in FIG. 3), and then rasterizing those statistics, as shown in FIG. 2, and as described in detail above. In one embodiment, vector data rasterizer 110 may generate rasterized statistics from the raw data. In one embodiment, the rasterized statistics may include, for example, (local) elevation, or LASER light reflectance intensities, etc. derived from a point cloud of LiDAR measurements. The rasterized vector statistics, including, for example, overview layers 151 (generated, for example, by pixel aggregation in an iterative procedure that builds up a pyramid of hierarchical coarse-grained rasters), are then stored in scalable distributed key-value store 161, as shown. It is noted that overview layers 151, in general, may include (local) elevation or surface models, point cloud statistics (e.g., density) or the like.

Continuing with reference to FIG. 5, in parallel to the vector data rasterization pathway through vector data rasterizer 110, the vector data 105 is also input to vector data curation 115, where, for example, vector data preprocessing and curation tools, such as, for example, PDAL, massage the vector data and turn it into a format readable by a scalable, distributed, and fault-tolerant key-value data store, such as scalable distributed key-value store 161. Thus, following vector data curation 115, the vector data is in ASCII text CSV file format 130 as shown (because this is an output format, and not an element of vector data ingestion engine 100, this box is shown in a dotted line). As the data store, for example, a scalable vector data store, query and analytics engine 150 may be used, which may be hooked onto the scalable distributed key-value store 161 where raster data are natively stored. An example of a large scale geospatial query and analytics tool 150 may be Geomesa™ or Geo-Wave™, for example. It is further noted that if pre-processing 125 correctly massages the data, direct ingestion into the scalable distributed key-value store 161 may be optionally performed, as shown by bolded dashed line 178, which has a direct path from pre-processing 125 to scalable distributed key-value store 161.

In one embodiment, curation of the data at vector data curation 115 may include reprojection of the vector data into a unified co-ordinate reference system, as shown at data reprojection 152 or, for example, may include data filtering based upon certain criteria defined by and retrieved from metadata 155 which may be, for example, extracted by vector data creation 115, as shown. Moreover, for ingestion, full spatio-temporal indexing of the data needs an associated, properly formatted timestamp, if not present already, as shown at timestamp translation 156.

Continuing with reference to FIG. 5, raw point cloud data 107, or more generally vector data 105, after uploading to the vector data ingestion engine 100 by data uploader 120, follows path 156 to preprocessing 125, for storage, either via large scale geospatial query and analytics 150 in key-value store 161 along path 171, or from preprocessing 125 directly to vector database 163 along path 173.

Continuing still further with reference to FIG. 5, vector data curation 115, as shown by path 155, extracts, from the vector data, associated metadata information (e.g., data collection vendor, sensor parameters, etc.) and links it to a timestamp and geo-spatial area represented by an appropriate geospatial data structure such as, for example, a minimum spanning tree, a (multi)polygon, or the like. The resulting data structure may be, for example, ingested into vector database 163 (for small data volume), via path 175, or, for larger volumes, become part of scalable distributed key-value store 161, along path 176, through scalable vector data store, query and analytics engine 150.

By way of example, FIG. 4, as described above, reveals details on how the geospatial data structure for the metadata is implemented and linked to the geospatial index (shown in FIGS. 1, 2 and 3 as elements 1013, 211 and 301, respectively, which itself is central to the vector-raster fusion disclosed herein. To associate the extracted metadata back to the ingested vector data, the geometry index 413 or the geometry 415 itself may be employed. For example, to obtain the metadata of points 311, its coordinates may be used to perform a "point in polygon" query on a metadata database which yields a match with polygon 431. Should this query return multiple polygons, for example, then further refinement may be obtained by comparing the timestamp of the point 311 with the timestamp of the metadata polygon. As one example, the IBM PAIRS system combines the spatial Z-order and timestamp to form the key in its specific version of scalable distributed key-value store 161.

Figure 6:
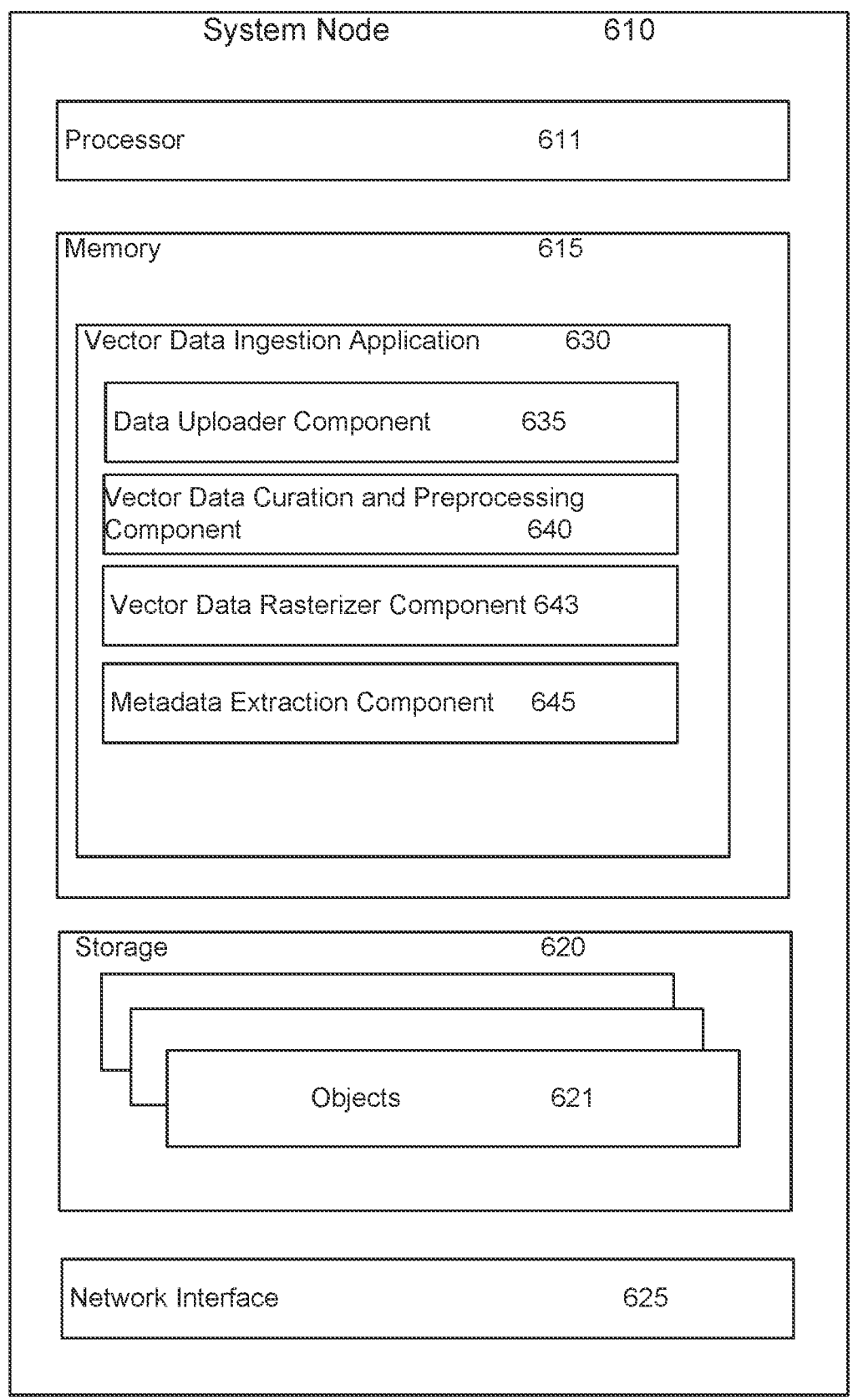
FIG. 6 is a block diagram illustrating a system node configured to provide vector-raster fusion, according to one embodiment disclosed herein.

FIG. 6 is a block diagram illustrating a system node configured to provide vector-raster fusion, according to one embodiment disclosed herein. System Node 610 is equivalent to the vector data ingestion engine 100 schematically depicted in FIG. 5, but, for ease of illustration, without showing in FIG. 6 all of the internal (or external) communications pathways that are shown in FIG. 5. In the illustrated embodiment, system node 610 includes a processor 611, memory 615, storage 620, and a network interface 625. In the illustrated embodiment, the processor 610 retrieves and executes programming instructions stored in memory 615, as well as stores and retrieves application data residing in storage 620. The processor 611 is generally representative of a single CPU, multiple CPUs, a single CPU having multiple processing cores, and the like. The memory 615 is generally included to be representative of a random access memory. Storage 620 may be disk drives or flash-based storage devices, and may include fixed and/or removable storage devices, such as fixed disk drives, removable memory cards, or optical storage, network attached storage (NAS), or storage area network (SAN). Storage 620 may include one or more data bases, including IASPs. Via the network interface 625, the system Node 610 can be communicatively coupled with one or more other devices and components, such as other System Nodes 610, monitoring nodes, storage nodes, and the like.

In the illustrated embodiment, storage 620 includes a set of objects 621. Although depicted as residing in Storage 620, in embodiments, the objects 621 may reside in any suitable location. In embodiments, the Objects 621 are generally representative of any data (e.g., application data, saved files, databases, and the like) that is maintained and/or operated on by the system node 610. Objects 621 may include vector data, whether digitally encoded or in raw point cloud form, vector statistics, rasterized vector statistics, and metadata, all as described above. Objects 621 may further include one or more algorithms to process vector data into vector data statistics, one or more algorithms to curate vector data, one or more algorithms to extract metadata from vector data, and one or more algorithms to rasterize vector statistics, as described above.

As illustrated, the vector data ingestion application 630 includes a data uploader component 635, a vector data curation and preprocessing component 640, a vector data rasterizer component 643, and a metadata extraction component 645. Although depicted as discrete components for conceptual clarity, in embodiments, the operations and functionality of data uploader component 635, vector data curation and preprocessing component 640, vector data rasterizer component 643, and metadata extraction component 645, if implemented in the system node 610, may be combined, wholly or partially, or distributed across any number of components.

In an embodiment, the data uploader component 635 is used to receive vector data relating to a geographic location for which raster data is already stored in a key-value store. In some embodiments, the data uploader component 635 is an application programming interface (API) that is automatically accessed by a client application to submit vector data to the vector data ingestion application 630 to store the vector data, after processing and rasterization, so that queries may later be made on the key-value store for fused, or joined, or combined, vector and raster data for any given geographical location. Once vector data is uploaded to the data ingestion application, it is processed as described above with reference to the data ingestion engine of FIG. 5.

In embodiments, System Node 610 may receive and send data, such as from one or more sources of geospatial vector data, to one or more geospatial key-value stores, via Network Interface 625.

Figure 7:
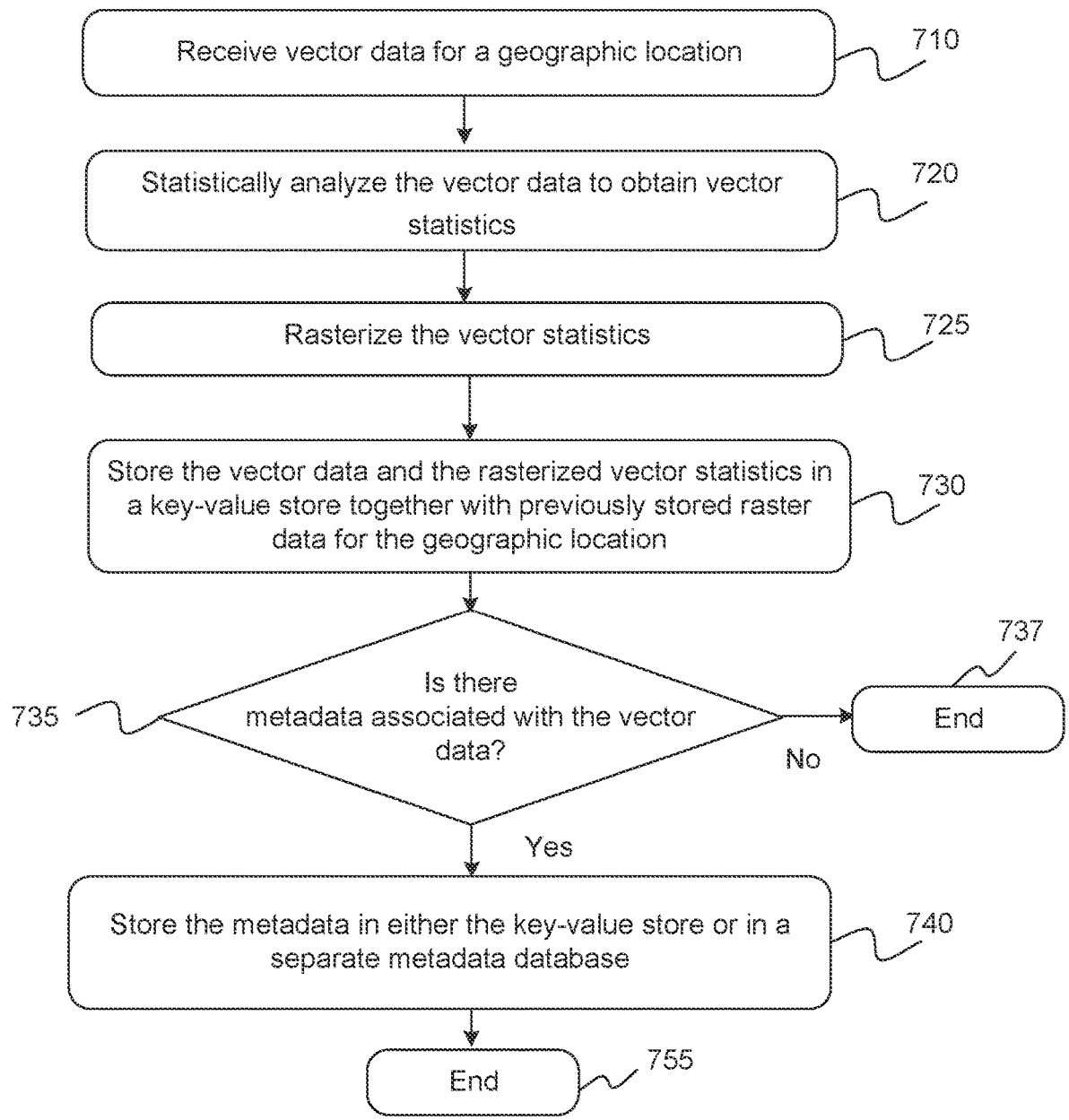
FIG. 7 depicts the process flow of an example vector-raster fusion method, according to one embodiment disclosed herein.

FIG. 7 depicts a process flow diagram of a vector-raster data fusion method, according to one embodiment disclosed herein. Method 700 includes blocks 710 through 755. In alternate embodiments, method 700 may have more, or fewer, blocks. In one embodiment, method 700 may be performed, for example, by vector data ingestion engine 100 of FIG. 5, or, for example, by system node 610 of FIG. 6, in particular by vector data ingestion application 630.

Continuing with reference to FIG. 7, method 700 begins at block 710, where vector data for a given geographical location is received. For example, the data may include a point cloud of LiDAR measurements.

From block 710 method 700 proceeds to block 720, where the vector data is statistically analyzed to obtain vector statistics. For example, these may be (local) elevation, spatial point cloud density, or statistics of LASER light reflection intensities, number of LASER light pulse returns, etc., derived from the point cloud of LiDAR measurements, or any other statistics as may be desired or useful.

From block 720, method 700 proceeds to block 725, where the vector statistics are rasterized. For example, the calculated vector statistics may be joined to respective cells of a raster grid, as shown in FIG. 2 and described above, where the raster grid uses the same universal co-ordinate reference system as raster data previously stored in a key-value store.

From block 725, method 700 proceeds to block 730, where the vector data and the rasterized vector statistics are stored in a key-value store together with previously stored raster data for the geographic location. For example, the vector data 105 and the rasterized vector statistics output from vector data rasterizer of FIG. 5 may be stored in a fused manner in scalable distributed key-value store 161, with previously stored raster data for the geographic location, thus affording the ability of a user to query the key-value store and obtain both all raster data and all vector data relevant to a geographic location.

From block 730 method 700 proceeds to query block 735, where it is determined if there is metadata associated with the vector data. For example, the metadata may indicate the origin of the vector data, as shown, for example, in column 417 "metadata" in FIG. 4, described above. If a "No" is returned at query block 735, and thus there is no metadata, then method 700 moves to block 737, and method 700 then ends.

If, however, the return to query block 735 is a "Yes", and thus there is metadata that has been extracted from the vector data, then method 700 proceeds to block 740, where the metadata is either stored in the key-value store or in a separate metadata database, for example, vector DB 163 of FIG. 5, and method 700 ends.

Figure 8:
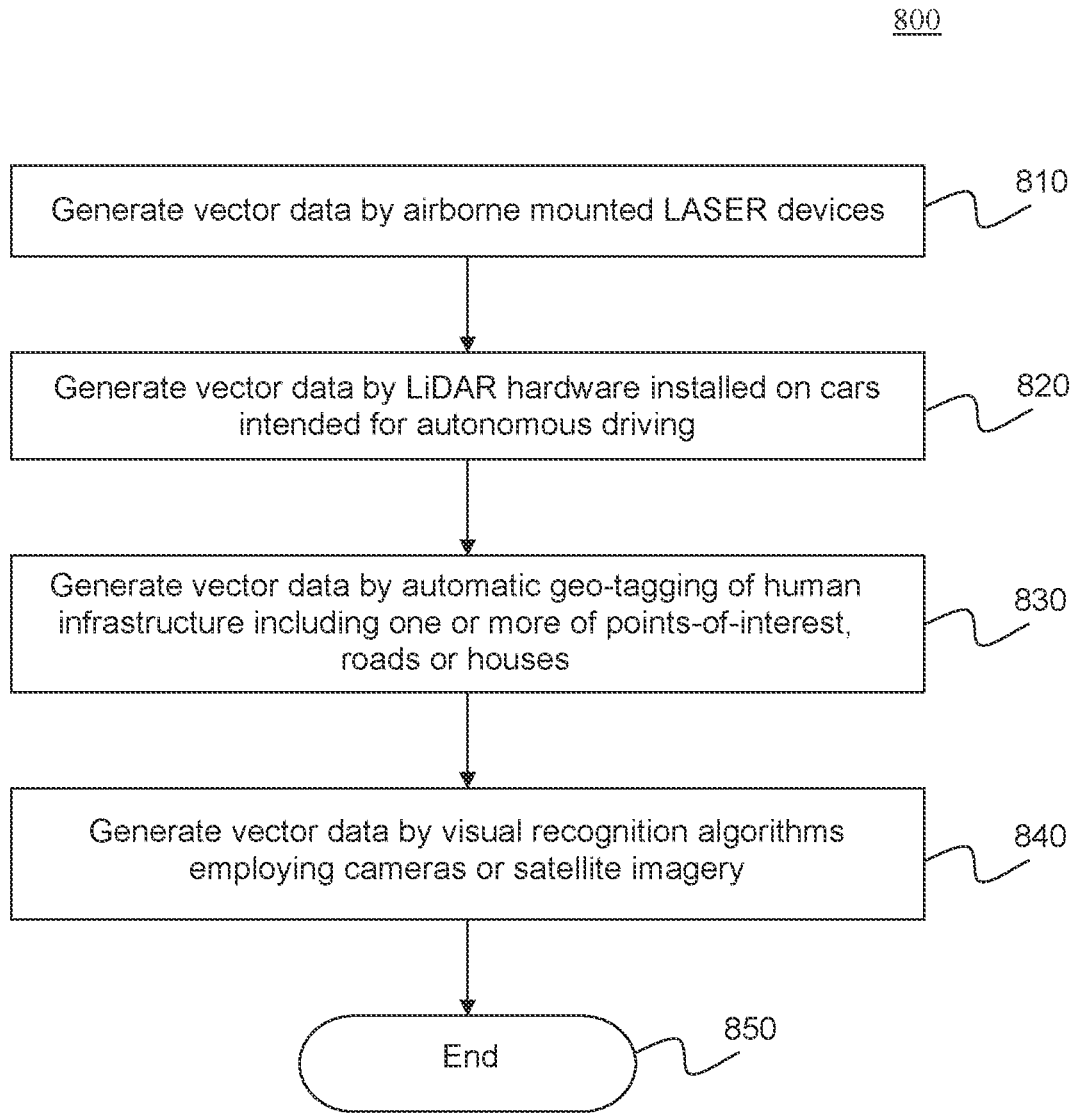
FIG. 8 depicts the process flow of an example vector data generation method, according to one embodiment disclosed herein.

FIG. 8 depicts a process flow diagram of a vector data generation method, according to one embodiment disclosed herein. Method 800 includes blocks 810 through 850. In alternate embodiments, method 800 may have more or fewer blocks and/or a different ordering of blocks. As shown, method 800 begins at block 810, where vector data is optionally generated by airborne mounted LASER devices. From block 810, method 800 proceeds to block 820, where vector data is optionally generated by LiDAR hardware installed on cars intended for autonomous driving. From block 820, method 800 proceeds to block 830, where vector data is optionally generated by automatic geo-tagging of human infrastructure including one or more of points-of-interest, roads or houses. From block 830, method 800 proceeds to block 840, where vector data is optionally generated based on visual recognition algorithms employing cameras or satellite imagery. Following block 840, method 800 ends at block 850.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a vector data ingestion application, a related geospatial data query and display application) or related data available in the cloud. For example, the vector data ingestion application could execute on a computing system in the cloud and process uploaded vector data relevant to a geographic location to generate vector statistics, rasterize the vector statistics, and store both the rasterized vector statistics and the vector data to a key-value store together with previously stored raster data relevant to the same geographic location for later availability to respond to user queries. In such a case, the vector data ingestion application could store the fused vector-raster data at a key-value storage location in the cloud. Doing so allows a user to access this information by querying the key-value store, such as, for example, via a GIS, from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method performed by a system comprising one or more processors, the one or more processors performing the steps of:
   receiving vector data for a geographical location;
   statistically analyzing the vector data to obtain vector statistics;
   rasterizing the vector statistics; and
   storing at least one of the rasterized vector statistics and or the vector data in a key-value store together with previously stored raster data for the geographic location, wherein the previously stored raster data is indexed by at least one of a same spatial index or same spatial co-ordinates as is the at least one of the rasterized vector statistics or the vector data.

2. The method of claim 1, wherein the key-value store is scalable and distributed.

3. The method of claim 1, wherein geographical location is a cell of a raster grid and wherein the vector data includes at least one of a spatial index or spatial co-ordinates, and a vector data value.

4. The method of claim 1, wherein the vector data is generated by one or more of:
   airborne mounted LASER devices,
   LiDAR hardware installed on cars intended for autonomous driving,
   automatic geo-tagging of human infrastructure including one or more of points-of-interest, roads or houses, or
   visual recognition algorithms employing cameras or satellite imagery.

5. The method of claim 1, wherein statistically analyzing the vector data further comprises calculating at least one of a density or a center of mass inertia tensor of the vector data for the geographical location.

6. The method of claim 1, wherein a size of the geographical location is that of a cell in a geographical co-ordinate reference system.

7. The method of claim 6, wherein the geographical co-ordinate reference system is at least two dimensional, including a latitude value and a longitude value for each location.

8. The method of claim 1, wherein the vector data further includes metadata, and further comprising storing the metadata in at least one of the key-value store or a separate vector database.

9. The method of claim 1, further comprising extracting the metadata, and linking it to a geo-spatial area comprising one or more of a polygons, multipolygon or minimum spanning tree such that the metadata can be associated back with the vector data.

10. A system, comprising:
    one or more computer processors; and
    a memory containing a data ingestion engine, that comprises:
    a data uploader configured to receive vector data; and
    a vector data rasterizer, coupled to the data uploader and to a key-value store, and configured to generate rasterized vector statistics from the vector data and store at least one of the rasterized vector statistics or the vector data, together with previously stored raster data, in a key-value store, wherein the previously stored raster data is indexed by at least one of a same spatial index or same spatial co-ordinates as is the at least one of the rasterized vector statistics or the vector data.

11. The system of claim 10, further comprising a vector data curator and preprocessor coupled to the data uploader, and configured to transform the vector data into a format that is readable by the key-value store.

12. The system of claim 11, further comprising a scalable distributed key value store coupled to each of the vector data rasterizer and the preprocessor, configured to store fused vector-raster data and retrieve it when queried by a user.

13. The system of claim 10, wherein the vector data further incudes metadata, and wherein the data uploader is further configured to extract the metadata and link it to a geo-spatial area comprising one or more of a polygon, a multi-polygon or a minimum spanning tree.

14. The system of claim 13, wherein the data uploader is further configured to at least one of:
    store the metadata in a vector database, or
    store the metadata in a separate metadata database.

15. A computer program product for fusion of vector data and raster data for a geographic location, the computer program product comprising:
    a non-transitory computer-readable medium having computer-readable program code embodied therewith, the computer-readable program code executable by one or more computer processors to:
    receive vector data for a geographical location;
    statistically analyze the vector data to obtain vector statistics;
    rasterize the vector statistics; and
    store at least one of the rasterized vector statistics or the vector data in a key-value store together with previously stored raster data for the geographic location, wherein the previously stored raster data is indexed by at least one of a same spatial index or same spatial co-ordinates as is the at least one of the rasterized vector statistics or the vector data.

16. The computer program product of claim 15, wherein the key-value store is a scalable, distributed and fault tolerant key-value store.

17. The computer program product of claim 15, wherein the computer-readable program code is further executable to:
    calculate at least one of a density or a center of mass inertia tensor of the vector data for the geographical location as part of the vector statistics.

18. The computer program product of claim 15, wherein the vector data further includes metadata, and wherein the computer-readable program code is further executable to:
    store the metadata in at least one of the key-value store or a separate vector database.

19. The computer program product of claim 15, wherein the vector data includes at least one of a spatial index or spatial co-ordinates, and a vector data value.

* * * * *